UNITED STATES PATENT OFFICE.

CHARLIE WILLIAMS, OF GRANITE CITY, ILLINOIS, ASSIGNOR OF ONE-THIRD TO NELS NELSON, OF GRANITE CITY, ILLINOIS.

PROCESS FOR TREATING PICKLED PLATES.

1,360,843. Specification of Letters Patent. Patented Nov. 30, 1920.

No Drawing. Application filed June 9, 1919. Serial No. 302,726.

*To all whom it may concern:*

Be it known that I, CHARLIE WILLIAMS, a citizen of the United States, residing at Granite City, Illinois, have invented a certain new and useful Improvement in Processes for Treating Pickled Plates, of which the following is a full, clear, and exact description, such as will enable others skilled in the art to which it appertains to make and use the same.

In the ordinary process of annealing pickled plates of iron or steel the plates are removed from the pickling bath, they are then boxed or formed into bundles while they are wet, and thereafter the boxes or bundles of wet plates are annealed. After the annealing operation considerable trouble and expense is required to separate the plates which stick together, and many plates are ruined and bent out of shape by the blows to which they are subjected during the operation of separating the plates that stick together.

The main object of my invention is to provide a process for preventing pickled plates from sticking together after they have been annealed, thereby materially reducing the cost of manufacturing annealed plates of iron or steel, due to the elimination of the labor of beating the plates to separate them and the waste that results from bending the plates out of shape during the operation of beating plates that stick together.

My process, briefly described, consists in treating the plates with a soapy solution after they have been removed from the pickling bath, then washing the plates, then drying the plates, and thereafter boxing the dry plates or forming them into bundles preparatory to annealing the plates. My process is applicable to black plates of iron or steel that have been pickled by any pickling process, and while the plates can be treated, washed and dried in various ways, without departing from the spirit of my invention, I prefer to remove the plates from the pickling bath, then immerse them in a hot solution of soap, salsoda or borax whose temperature is near the boiling point, then rinse the plates thoroughly in clear water so as to remove the treating solution and then dry the plates by passing them through felt rollers. The plates can be boxed in any preferred manner and they can be annealed in any suitable kind of annealing apparatus. I have found that pickled plates of iron or steel, when treated in the manner above described, will not stick together after they have been annealed. Accordingly, I claim that my process effects a great saving in the manufacture of annealed pickled plates, as no labor is required to separate the plates constituting a box or bundle, and none of the plates are damaged or bent out of shape during the operation of separating them.

Having thus described my invention, what I claim as new and desire to secure by Letters Patent, is:

1. A process for treating pickled plates, characterized by treating pickled plates with a soapy solution after they have been removed from the pickling bath, washing the plates, drying the plates, then forming the plates into bundles and thereafter annealing the plates.

2. A process for treating pickled plates, characterized by washing the plates with a hot, soapy solution after they have been removed from the pickling bath, rinsing the plates in water, drying the plates, then forming the plates into bundles, and thereafter annealing the plates.

3. A process for treating pickled plates, characterized by immersing the plates in a hot solution of soap, salsoda or borax after the plates have been removed from the pickling bath, rinsing the plates in clear water, passing the plates through drying rolls, then boxing the plates in a dry condition, and thereafter annealing the plates.

CHARLIE WILLIAMS.